R. J. JONES.
PORTABLE PLATFORM WAGON JACK.
APPLICATION FILED MAR. 9, 1911.
1,016,505.
Patented Feb. 6, 1912.
2 SHEETS—SHEET 1.
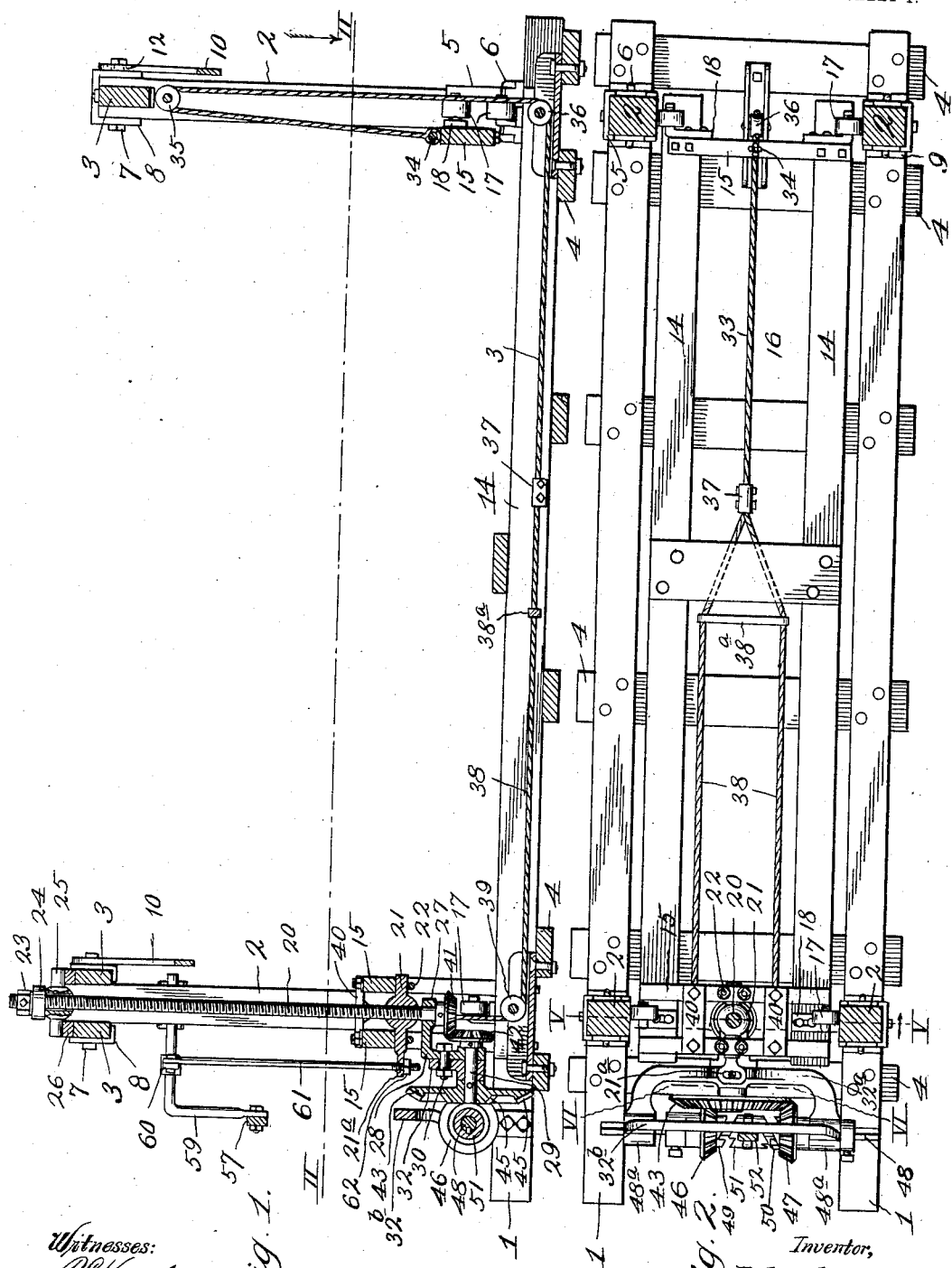
Witnesses:
R. Hamilton
E. C. Lillian
Inventor,
Robert J. Jones,
By F. G. Fischer,
Atty.

R. J. JONES.
PORTABLE PLATFORM WAGON JACK.
APPLICATION FILED MAR. 9, 1911.
1,016,505.
Patented Feb. 6, 1912.
2 SHEETS—SHEET 2.
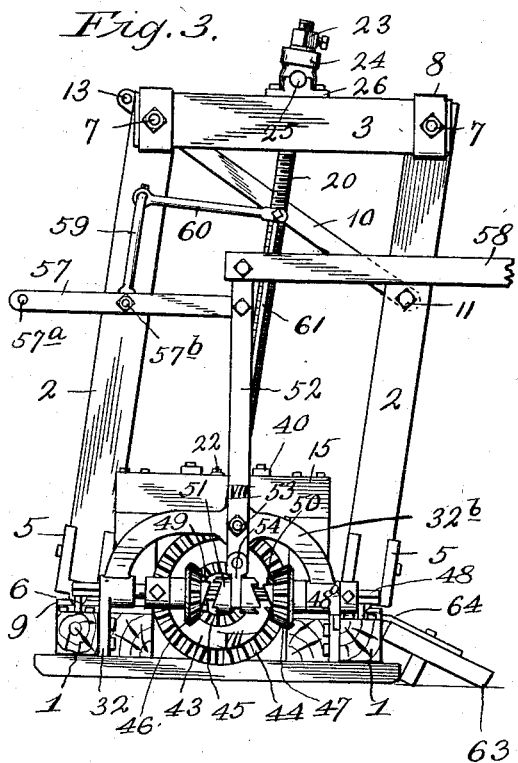
Fig. 3.
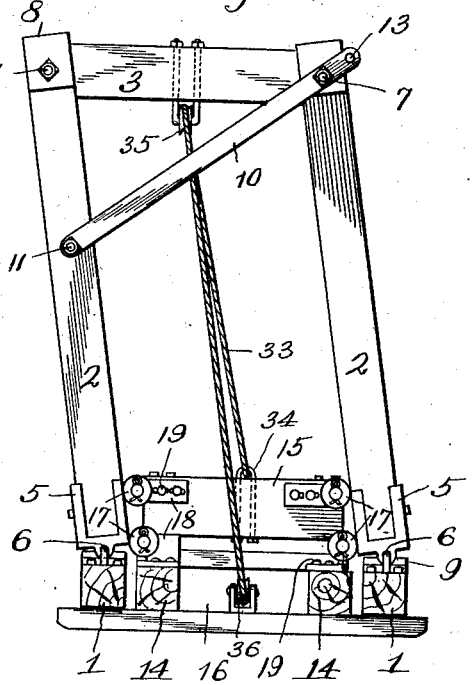
Fig. 4.
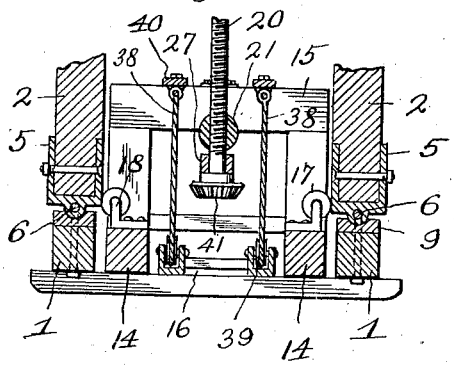
Fig. 5.
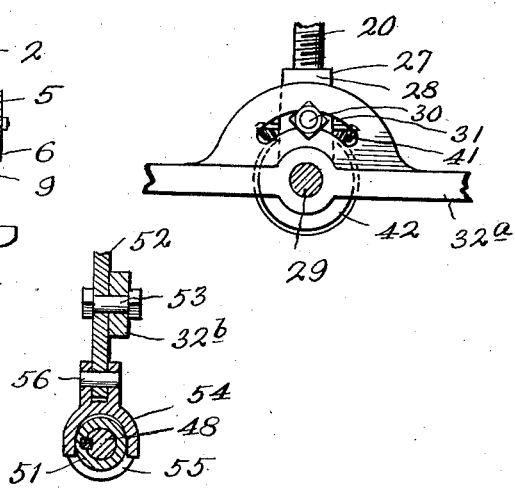
Fig. 6.
Fig. 7.
Witnesses:
R. Hamilton
E. C. Lillian
Inventor,
Robert J. Jones,
By F. G. Fischer,
Atty

UNITED STATES PATENT OFFICE.

ROBERT J. JONES, OF BARNESTON, NEBRASKA.

PORTABLE-PLATFORM WAGON-JACK.

1,016,505.  Specification of Letters Patent.  Patented Feb. 6, 1912.

Application filed March 9, 1911. Serial No. 613,439.

*To all whom it may concern:*

Be it known that I, ROBERT J. JONES, a citizen of the United States, residing at Barneston, in the county of Gage and State of Nebraska, have invented certain new and useful Improvements in Portable-Platform Wagon-Jacks, of which the following is a specification.

My invention relates to improvements in portable platform wagon jacks, and one of the objects of my invention is to provide an apparatus of this character wherein the platform may be lowered close to the ground so that the forward portion of a wagon can be readily driven in position thereon, preparatory to being raised so that its load may be dumped by force of gravity.

A further object of the invention is to provide a reversible tilting frame which will allow the platform to move upward at an angle with the forward end of the wagon, to prevent longitudinal movement of the same and thus prevent drawing the rear end of the wagon away from the feeder or apparatus into which the wagon is dumping.

A further object is to simplify the raising and lowering mechanism of the platform so that these operations may be performed through the aid of a single screw.

Other objects of the invention will hereinafter appear, and in order that the invention may be fully understood, reference will now be made to the accompanying drawings in which:

Figure 1 shows a vertical longitudinal section of the apparatus on line I—I of Fig. 2. Fig. 2 is a horizontal section on line II—II of Fig. 1. Figs. 3 and 4 show opposite ends of the apparatus. Fig. 5 is an irregular broken, vertical section on line V—V of Fig. 2. Figs. 6 and 7 are sections taken on lines VI—VI and VII—VII of Figs. 2 and 3, respectively.

In carrying out my invention, I employ a main frame consisting of a pair of longitudinal sills 1, a pair of posts 2, arranged near each end of said sills, and a transverse beam 3 connecting the upper ends of each pair of posts, said upper ends being bifurcated to receive the ends of the beams, as shown in Fig. 1. Sills 1 are secured to a plurality of runners 4, whereby the apparatus may be drawn from point to point as required. Posts 2 are provided at their lower ends with hinge-members 5 engaging hinge-members 6 on sills 1, and beams 3 are pivotally-connected at the forked upper terminals of the posts by bolts 7 extending through reinforcing metal caps 8. The lower curved portions of hinge-members 6 rest in saddles 9, secured to the tops of sills 1 to carry the weight of the posts and their load and to prevent the hinge-members 6 from sinking into said sills. This construction permits posts 2 to be tilted to either side of vertical lines drawn through the hinge-member 6, and allows the forward end of the wagon to be raised on an arc struck from the rear axle thereof, without moving said wagon longitudinally.

Posts 2 are secured in their tilted positions by a pair of braces 10, each of which is pivotally-secured at its lower end to one of the posts by a bolt 11, and adjustably-secured at its upper end to the opposing post by the bolt 7, said upper end of the brace being provided with holes 12 and 13 through the former of which bolt 7 is placed when the posts are tilted to the position shown in Figs. 3 and 4, and through the latter of which bolt 7 is placed when the posts are tilted in a reverse direction to that shown in said Figs. 3 and 4.

The movable platform for raising and lowering the front end of the wagon consists of a pair of longitudinal sills 14, and a plurality of transverse beams 15, connecting said sills, which are placed sufficiently close together to pass down between sills 1, and thus rest upon the runners 4, thereby making it easy to draw the front wheels of a loaded wagon in position upon the platform. Sills 14 are spaced apart to leave a channel 16 into which the front wheels of the wagon partly enter so that said wheels may be held by the sills 14 while being raised or lowered. Channel 16 also provides a way for that portion of the raising and lowering mechanism extending longitudinally of the platform so that said portion will not extend above the platform and be in the way of the front wheels of the wagon.

The platform is held in horizontal position when moving upward or downward by four pairs of antifrictional guide-rollers 17, arranged to travel on the inner sides of posts 2, and carried by slotted brackets 18 adjustably-secured to the ends of the platform by bolts 19, so that rollers 17 may be moved backward or forward as the case may be, to engage posts 2 when the same are in the position shown or in a reverse position.

The platform is raised through the intermediacy of a screw 20 engaging an internally-threaded cross-head 21, secured to the undersides of the pair of cross beams 15 at one end of the platform by U-bolts 22. Screw 20 is suspended at its upper end by a nut 23, resting on a step-bearing 24 provided with a pair of trunnions 25, rockingly-mounted in a pair of bearings 26, secured on top of the adjacent pair of beams 3. The lower end of screw 20 is journaled in a bearing 27, extending inwardly from a casting 28, rockingly-mounted upon a shaft 29 and normally held stationary by a bolt 30 extending through the slotted portion 31 of a casting 32. By thus mounting screw 20 in the adjustable bearings 24 and 27, said screw may be tilted in reverse directions and thus remain in parallel relation to the adjacent posts 2, between which it extends. Screw 20, through the intermediacy of the cross-head 21, directly raises and lowers the adjacent end of the platform and indirectly raises and lowers the opposite end of the platform through the intermediacy of a cable 33, secured to the adjacent beam 15 by a U-bolt 34, thence extends upward over a sheave 35, thence downward beneath a sheave 36, thence horizontally between sills 14, where it is connected by a clamp 37 to a pair of cables 38, which extend upward around a pair of sheaves 39 and are attached at their upper ends to the eyes on the undersides of a pair of transverse bars 40 secured upon the adjacent pair of transverse beams 15. Cables 38 are spaced apart by sheaves 39 and a spreader 38$^a$ to pass upward at the opposite sides of a bevel gear-wheel 41, to prevent contact therewith.

Bevel gear-wheel 41 is fixed to the lower end of screw 20 and adapted to be driven in either direction by a train of gearing consisting of a bevel gear-wheel 42, intermeshing with gear-wheel 41 and fixed to the inner end of shaft 29, a large bevel gear-wheel 43 fixed to the outer end of shaft 29 and having concentric rows of teeth 44 and 45, a small bevel gear-wheel 46 intermeshing with teeth 45, and a larger bevel gear-wheel 47 intermeshing with teeth 44. By making the bevel gear 46 of less diameter than bevel gear 47, the platform is lowered at a greater speed than when it is raised, thus effecting a saving of time in the use of the apparatus. Bevel gear-wheels 46 and 47 are fixed to a drive-shaft 48. Shaft 29 is journaled in a yoke 32$^a$ and shaft 48 is secured to the main sills 1, (see Fig. 3).

Bevel gears 46 and 47 have integral clutch-members 49 and 50, respectively, adapted to be engaged by the corresponding faces of a clutch 51 splined upon shaft 48 to rotate therewith, but free to slide longitudinally thereon to alternately engage the clutch-members 49 and 50. Clutch 51 is actuated by a shifting-lever 52 fulcrumed upon a bolt 53 and provided at its lower end with a fork 54, fitting snugly in the peripheral groove 55 of clutch 51. Fork 54 is pivotally-secured by a pin 56 to lever 52, so that it will not bind against the opposite sides of groove 55 when said lever is thrown to neutral vertical position. Bolt 53 is carried by a yoke 32$^b$ integral with casting 32. Shifting-lever 52 may be operated manually, to draw clutch 51 into engagement with either of the clutch-members 49 and 50, at a point close to the apparatus, by a handle 57, or at a distance, such as the rear portion of the wagon, by a bar 58, both of which are pivotally-connected to the upper portion of said shifting-lever.

Shifting-lever 52 is actuated automatically to throw clutch 51 to neutral position, intermediate the clutch members 49 and 50, when the platform reaches the upper or lower end of its movement by shifting mechanism controlled by the cross-head 21, and consisting of a crank-shaft 59 rockingly-mounted in the adjacent post 2, a crank 60 fixed at one end to the crank-shaft 58, and a rod 61 pivotally-connected to the free end of crank 59 and extending through an elongated eye 21$^a$ on cross-head 21, the lower end of rod 61 being threaded and provided with a nut 62 to engage the underside of eye 21$^a$. With this mechanism it will be understood that as the platform approaches the end of its upper movement, eye 21$^a$ will engage the free end of crank 60 and raise the same upward until clutch 51 is thrown to neutral position, and that when the platform reaches the end of its downward movement, eye 21$^a$ will engage nut 62 and throw clutch 51 to neutral position. Handle 57 has a hole 57$^a$, at its outer end so that the lower end of crank 59 may be pivotally-connected thereto by bolt 57$^b$, when the frame is tilted in reverse position to that shown in Fig. 3.

In order that the front wheels of the wagon may readily pass over sills 1, I provide an inclined approach consisting of a plank 63, provided with hooks 64, adapted to engage either of the sills 1, so that the wagon may be driven upon the platform from either side of the apparatus.

While I have shown and described the preferred form of my apparatus, I, of course, do not limit myself to the exact combination and arrangement of parts shown, but reserve the right to make such changes as properly fall within the spirit and scope of the appended claims.

Having thus described my invention, what I claim, and desire to secure by Letters Patent, is:

1. In an apparatus of the character described, a platform adapted to raise and lower the forward end of a wagon, a tiltably-mounted frame adapted to guide said platform in its travel, and means for raising and lowering said platform, consisting of a screw tiltable with the platform, means for rotating said screw in either direction, an internally threaded cross-head fixed to one end of the frame and adapted to travel up and down on said screw, and a suitably guided cable secured to opposite ends of the platform.

2. In an apparatus of the character described, a platform adapted to raise and lower the forward end of a wagon, a tiltable frame for guiding said platform in its travel, means for securing said frame in tilted position, a screw tiltable with the frame to raise and lower the platform, gearing to drive said screw in either direction, and means actuated by the screw to throw said gearing to inoperative position when the platform reaches the end of its upward or downward movement.

3. In an apparatus of the character described, a platform adapted to raise and lower a wagon, a frame to guide said platform and which may be tilted to either side, means for securing said frame in tilted position, a screw tiltable with the frame to raise and lower the platform, adjustable bearings on the frame to carry said screw, gearing embodying two opposite drive-wheels to drive the screw in either direction, a rotary clutch adapted to slide into engagement with either of said drive-wheels, a lever to actuate said clutch, manually-controlled means to actuate said lever, and automatic means primarily controlled by the screw to actuate said lever to throw the clutch to neutral position when the platform reaches the end of its upward or downward stroke.

4. In an apparatus of the character described, a platform adapted to raise and lower the forward end of a wagon, an adjustable frame adapted to be tilted to either side and guide the platform in its travel, a tiltable screw centrally arranged at one end of the platform and the frame to raise said platform, a cable attached to the opposite end of the platform and running over guide pulleys to assist in raising the platform, a pair of cables attached to the lower end of the first-mentioned cable and extending upward at opposite sides of the screw, means carried by the platform to which the upper ends of said cables are attached, and a spreader at the lower end of said cables to prevent the same from contacting with the screw during movement of the platform.

5. An apparatus of the character described, consisting of a platform adapted to raise and lower the forward end of a wagon, a frame adapted to be tilted to either side and guide the platform in its travel, means including a screw to simultaneously raise both ends of said platform, a bearing in which one end of said screw is journaled, said bearing having trunnions so that it may tilt with the frame, an adjustable bearing in which the opposite end of the screw is journaled, and means for locking said adjustable bearing in any of its adjusted positions.

In testimony whereof I affix my signature, in the presence of two witnesses.

ROBERT J. JONES.

Witnesses:
  E. C. LILLIAN,
  F. G. FISCHER.

---

Copies of this patent may be obtained for five cents each, by addressing the "Commissioner of Patents, Washington, D. C."